(12) United States Patent
Ninomiya

(10) Patent No.: US 11,453,249 B2
(45) Date of Patent: Sep. 27, 2022

(54) TIRE

(71) Applicant: Sumitomo Rubber Industries, Ltd., Kobe (JP)

(72) Inventor: Hiroaki Ninomiya, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 16/589,680

(22) Filed: Oct. 1, 2019

(65) Prior Publication Data

US 2020/0122522 A1 Apr. 23, 2020

(30) Foreign Application Priority Data

Oct. 22, 2018 (JP) .............................. JP2018-198282

(51) Int. Cl.
*B60C 15/06* (2006.01)

(52) U.S. Cl.
CPC .................................... *B60C 15/06* (2013.01)

(58) Field of Classification Search
CPC ......... B60C 15/06; B60C 17/00; B60C 15/00; B60C 1/00; B60C 13/00
See application file for complete search history.

(56) References Cited

U.S. PATENT DOCUMENTS

| 5,725,702 A * | 3/1998 | Nakamura | B60C 15/06 |
| | | | 152/539 |
| 6,273,162 B1 * | 8/2001 | Ohara | B60C 1/0008 |
| | | | 152/539 |
| 2003/0062106 A1 * | 4/2003 | Kanenari | B60C 1/0008 |
| | | | 152/517 |

FOREIGN PATENT DOCUMENTS

| JP | 2006159944 A | * | 12/2004 | ............. | B60C 5/14 |
| JP | 2015-160490 A | | 9/2015 | | |
| JP | 2019098976 A | * | 12/2017 | ............. | B60C 15/06 |
| WO | 2015186654 | * | 6/2015 | ............. | B60C 15/00 |

* cited by examiner

*Primary Examiner* — Jeffrey M Wollschlager
*Assistant Examiner* — Shibin Liang
(74) *Attorney, Agent, or Firm* — Birch, Stewart, Kolasch & Birch, LLP

(57) ABSTRACT

A tire comprises a carcass ply extending between bead portions through a tread portion and sidewall portions, and turned up around a bead core in each of the bead portions from the inside to the outside in the tire axial direction so as to form a pair of turnup portions and a main portion therebetween.
Each of the bead portions is provided with: a rubber bead apex disposed between the turnup portion and the main portion, and extending radially outwardly from the bead core in a tapered manner; a bead reinforcing rubber layer disposed axially outside the main portion; and an insulation rubber layer disposed between the main portion and the bead reinforcing rubber layer and having a hardness smaller than a hardness of the bead reinforcing rubber layer.

8 Claims, 4 Drawing Sheets

TIRE

TECHNICAL FIELD

The present invention relates to a tire, more particularly to a pneumatic tire having an apex rubber disposed in a bead portion.

BACKGROUND ART

Patent Document 1 below discloses a pneumatic tire in which a first apex and a second apex are disposed in a bead portion, and a turnup portion of a carcass ply is disposed between the first apex and the second apex.
In this structure, the turnup portion of the carcass ply is positioned inner side in the tire axial direction as compared with a conventional structure, so concentration of strain on the carcass ply turnup portion during running is suppressed. Thereby, an improvement in the durability of the bead portions is expected.
Patent Document 1: Japanese Patent Application Publication No. 2015-160490

SUMMARY OF THE INVENTION

Problems to be Solved by the Invention

In the tire of Patent Document 1, concentration of strain on the carcass ply turnup portion may be suppressed, but the strain tends to be concentrated between the main portion of the carcass ply and the second apex. This induces another problem such that separation tends to occur between the carcass ply main portion and the second apex. Thus, the tire of Patent Document 1 has room for improvement in the durability of the bead portions.
The present invention was made in view of the circumstances described as above, and a primary object of the present invention is to provide a tire in which the durability of the bead portions is further improved.
According to the present invention, a tire comprises: a tread portion whose outer surface defines the tread, a pair of axially spaced bead portions each provided with a bead core therein, a pair of sidewall portions extending between tread edges of the tread portion and the bead portions, and a carcass ply extending between the bead portions through the tread portion and the sidewall portions and turned up around the bead core in each of the bead portions from the inside to the outside in the tire axial direction so as to form a pair of turnup portions and a main portion therebetween,
wherein each of the bead portions is provided with
a rubber bead apex disposed between the turnup portion and the main portion of the carcass ply and extending radially outwardly from the bead core in a tapered manner;
a bead reinforcing rubber layer disposed axially outside the main portion of the carcass ply; and
an insulation rubber layer disposed between the bead reinforcing rubber layer and the main portion of the carcass ply and having a hardness smaller than a hardness of the bead reinforcing rubber layer.
It is preferable that a radially outer end of the insulation rubber layer is positioned radially outside a radially outer end of the bead reinforcing rubber layer.
It is preferable that the insulation rubber layer has a portion contacting with the rubber bead apex.
It is preferable that the insulation rubber layer has a portion contacting with the bead core.
It is preferable that the dimension in the tire radial direction of the portion of the insulation rubber layer contacting with the bead reinforcing rubber layer is not less than 0.40 times the dimension in the tire radial direction of the bead reinforcing rubber layer.
It is preferable that a hardness of the bead reinforcing rubber layer is 70 to 90 degrees.
It is preferable that the thickness of the insulation rubber layer is 0.8 to 2.3 mm.
It is preferable that the carcass ply is made of carcass cords coated with a topping rubber whose hardness is equal to or lower than the hardness of the insulation rubber layer.
It is preferable that the thickness of rubber measured from the carcass cords to the bead reinforcing rubber layer is 1.3 to 2.8 mm.
It is preferable that a radial distance from a bead base line to the radially outer end of the bead reinforcing rubber layer is in a range from 0.35 to 0.45 times a tire section height from the bead base line to the radial outermost end of the tread portion.
It is preferable that a radial distance from the bead base line to the radially inner end of the bead reinforcing rubber layer is in a range from 0.05 to 0.15 times the tire section height from the bead base line to the radially outermost end of the tread portion.
Therefore, in the tire according to the present invention, the insulation rubber layer can alleviate a stepped large difference in rigidity between the carcass ply main portion and the bead reinforcing rubber layer. Further, a shear strain between the carcass ply main portion and the bead reinforcing rubber layer is prevented form concentrating on the interface therebetween. As a result, a separation failure between the carcass ply main portion and the bead reinforcing rubber layer is effectively suppressed. Therefore, according to the present invention, the durability of the bead portions of the tire is improved.

DESCRIPTION OF THE PREFERRED EMBODIMENTS

Figure 1:
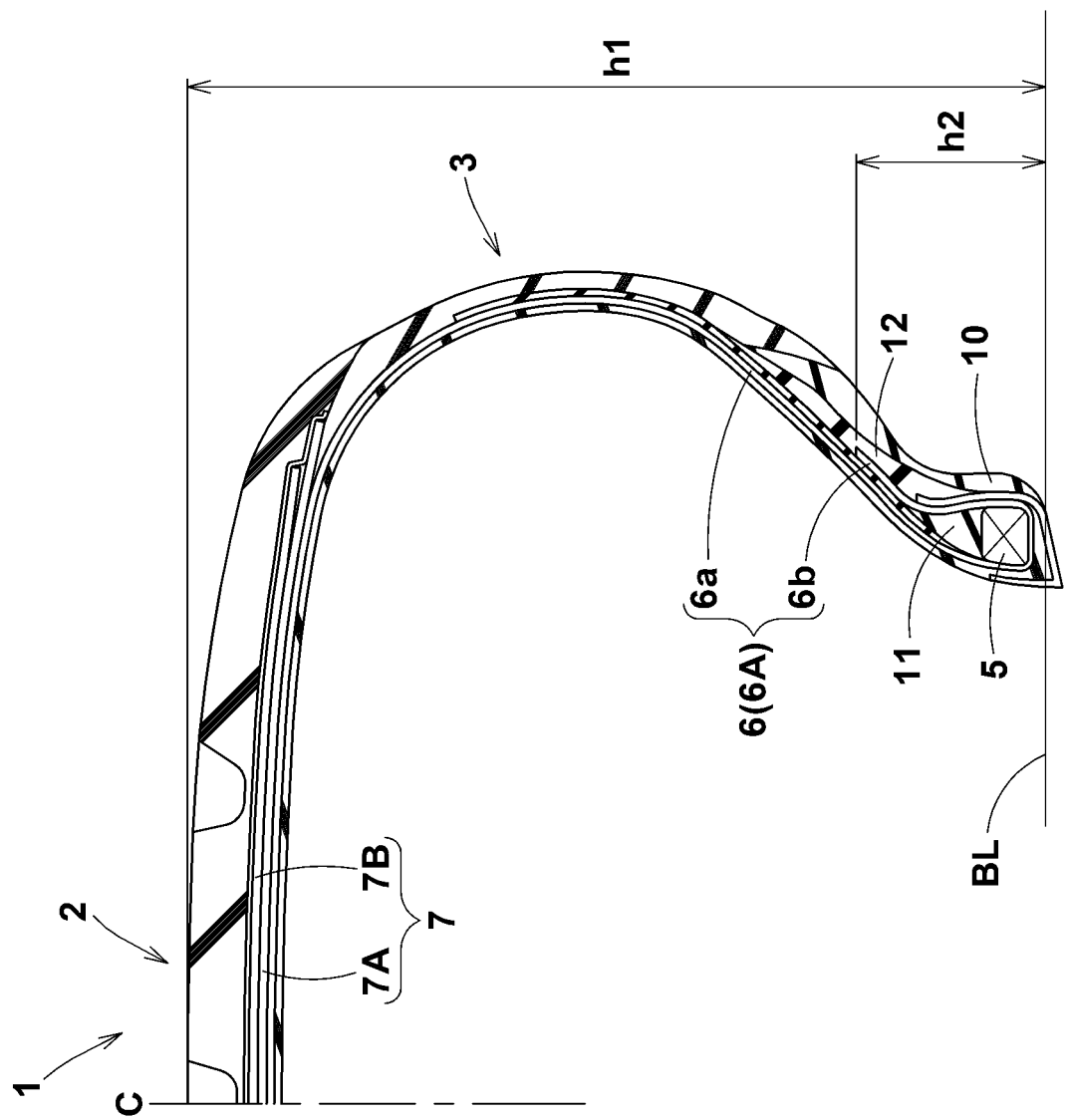
FIG. 1 is a cross-sectional view of a tire as an embodiment of the present invention.

The present invention can be applied to pneumatic tires for passenger cars, heavy duty vehicles such as truck and bus and the like, but suitably applied to a passenger car tire in particular.
Taking a pneumatic tire for passenger cars as an example, an embodiment of the present invention will now be described in conjunction with accompanying drawings.
FIG. 1 shows a cross section of a tire 1 as an embodiment of the present invention which is taken along a tire meridian plane including the rotational axis of the tire under a normally inflated unloaded condition of the tire.
In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure is the maximum air pressure for the tire specified by the same organization in the Air-pressure/Maximum-load Table or similar list.

For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like.

The undermentioned bead base line is as well known in the tire art a straight line drawn in parallel with the tire rotational axis, passing through the bead heel points. More specifically, the bead base line passes through a radial position corresponding to the rim diameter of the standard wheel rim.

As shown in FIG. 1, the tire 1 according to the present invention is a pneumatic tire and comprises:

a tread portion 2 whose outer surface defines the tread, a pair of axially spaced bead portions 4 each provided with a bead core 5 therein, a pair of sidewall portions 3 extending between tread edges of the tread portion 2 and the bead portions 3, and a carcass ply 6A extending between the bead portions 4 through the tread portion 2 and the sidewall portions 3, and turned up around the bead core 5 in each of the bead portions 4 from the inside to the outside in the tire axial direction so as to form a pair of turnup portions 6b and a main portion 6a therebetween.

In this embodiment, the above-said single carcass ply 6A constitutes the carcass 6 of the tire 1. However, the carcass 6 may be composed of a plurality of carcass plies 6A. The carcass ply 6A is made of carcass cords coated with a topping rubber.

The carcass cords in the carcass ply 6A are radially arranged, for example, at an angle in a range from 75 to 90 degrees with respect to the tire circumferential direction. As the carcass cords, for example, organic fiber cords such as nylon, polyester, rayon and the like are preferably used.

The radial distance h2 from the bead base line BL to the radially outer end of each turnup portion 6b is preferably set in a range from 0.15 to 0.35 times the tire section height h1 measured in the tire radial direction from the bead base line BL to the radially outermost end of the tread portion 2.

In the present embodiment, the tread portion 2 is provided with a belt layer 7 for reinforcing the tread portion 2. The belt layer 7 is, for example, composed of two belt plies 7A and 7B. Each belt ply 7A, 7B is made of parallel cords inclined with respect to the tire circumferential direction, for example, at an angle in a range from 10 to 45 degrees.

Figure 2:
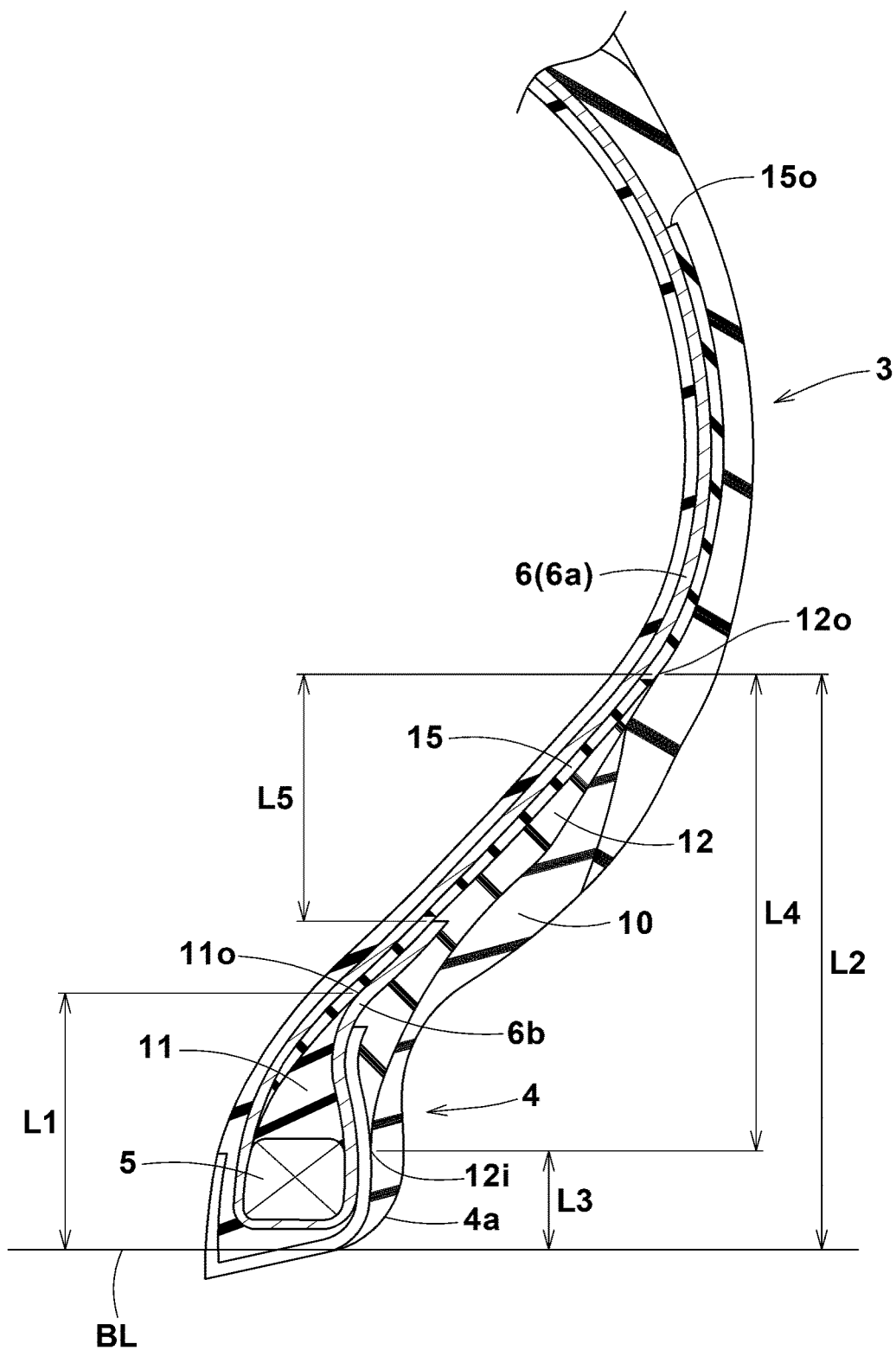
FIG. 2 is a cross-sectional view of a bead portion thereof.

Each of the bead portions 4 comprises the above-said bead core 5, a clinch rubber 10, a rubber bead apex 11, a bead reinforcing rubber layer 12, and an insulation rubber layer 15 as shown in FIG. 2.

The bead core 5 is formed by winding a bead wire a plurality of times in the tire circumferential direction into a predetermined cross sectional shape, for example, a substantially rectangular cross sectional shape.

The clinch rubber 10 is disposed so as to form at least a part of the outer surface of the bead portion 4 which contacts with a rim flange of a wheel rim when the tire is mounted thereon.

In the present embodiment, the clinch rubber 10 extends from a position in the bead base to a position radially outside the rim flange so as to form the heel 4a of the bead portion 4.

The rubber bead apex 11 is disposed on the radially outer side of the bead core and between the main portion 6a and the turnup portion 6b of the carcass ply 6A.

The rubber bead apex 11 extends radially outwardly from the bead core 5 in a tapered manner.

The radial distance L1 from the bead base line BL to the radially outer end 11o of the rubber bead apex 11 is preferably set in a range from 0.10 to 0.20 times the above-mentioned tire section height h1.

Preferably, the hardness of the rubber bead apex 11 is set in a range from 70 to 90 degrees.

In this application including specification and claims, the hardness of rubber means a durometer A hardness measured at a temperature of 23 degrees C. by using a type A durometer according to Japanese Industrial Standard (JIS) K6253.

The bead reinforcing rubber layer 12 is disposed axially outside the main portion 6a of the carcass ply 6A in each bead portion 4. And the bead reinforcing rubber layer 12 is disposed axially inside the clinch rubber 10 and not exposed in the outer surface of the tire.

In the present embodiment, the bead reinforcing rubber layer 12 extends along the carcass 6 (the carcass ply 6A) so as to cover a part of the carcass ply main portion 6a and a part of the carcass ply turnup portions 6b.

The radial distance L2 from the bead base line BL to the radially outer end 12o of the bead reinforcing rubber layer 12 is preferably set in a range from 0.30 to 0.50 times, more preferably 0.35 to 0.45 times the above-mentioned tire section height h1.

The radial distance L3 from the bead base line BL to the radially inner end 12i of the bead reinforcing rubber layer 12 is preferably set in a range from 0.02 to 0.18 times, more preferably 0.05 to 0.15 times the tire section height h1.

The hardness of rubber of the bead reinforcing rubber layer 12 is preferably set in a range from 70 to 90 degrees. In the present embodiment, the hardness of the bead reinforcing rubber layer 12 is the same as the hardness of the rubber bead apex 11. Thereby, local deformation of the bead portion 4 is suppressed, and excellent steering stability is exhibited.

The hardness of rubber of the insulation rubber layer 15 is smaller than that of the bead reinforcing rubber layer 12.

At least a part of the insulation rubber layer 15 is disposed between the bead reinforcing rubber layer 12 and the carcass ply main portion 6a to mitigate an abrupt change in the rigidity from the carcass ply main portion 6a to the bead reinforcing rubber layer 12. Thereby, the shear strain between the carcass ply main portion 6a and the bead reinforcing rubber layer 12 is suppressed, and a separation failure between the carcass ply main portion 6a and the bead reinforcing rubber layer 12 can be prevented. Thus, the durability of the bead portion 4 is improved.

In the present embodiment, as explained above, the carcass 6 is composed of the single carcass ply 6A, and in order to prevent the above-described separation and thereby effectively improve the durability of the bead portions 4, the radial height of the turnup portions 6b is set to be relatively low. Further, based on that the separation is effectively prevented, the hardness of the bead reinforcing rubber layer 12 is increased in order to improve the steering stability and also to suppress an increase in the weight of the bead portions 4.

It is preferable that the hardness of the insulation rubber layer 15 is equal to or larger than the hardness of the topping rubber of the carcass ply 6A. Specifically, the hardness of the insulation rubber layer 15 is preferably set in a range from 55 to 70 degrees. Such insulation rubber layer 15 can effectively prevent the separation between the carcass ply main portion 6a and the bead reinforcing rubber layer 12.

Figure 3:
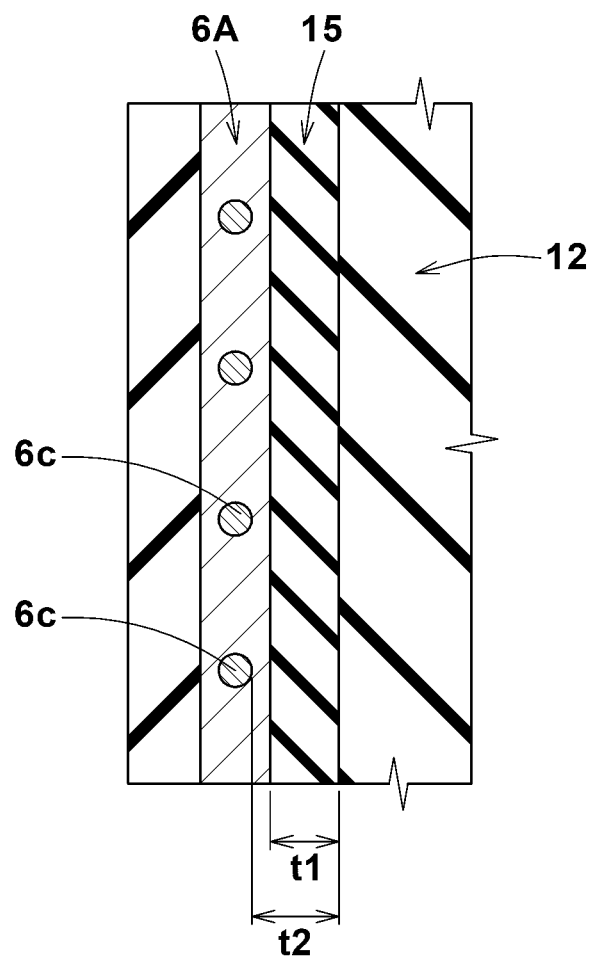
FIG. 3 is an enlarged cross sectional view of a insulation rubber layer thereof.

As shown in FIG. 3, the thickness t1 of the insulation rubber layer 15 is preferably set in a range from 0.8 to 2.3 mm. The rubber thickness t2 (including t1) from the carcass cords 6c to the bead reinforcing rubber layer 12 is preferably set in a range from 1.3 to 2.8 mm.

In this embodiment, the insulation rubber layer 15 extends in the tire radial direction, abutting on the axially outer surface of the main portion 6a of the carcass ply 6A as shown in FIG. 2.

The radially outer end 15o of the insulation rubber layer 15 is preferably located radially outside the radially outer end 12o of the bead reinforcing rubber layer 12, more preferably located radially outside a radial position at which the cross sectional width of the tire (or carcass) becomes maximum. Specifically, the radial height from the bead base line BL to the radially outer end 15o of the insulation rubber layer 15 is preferably set in a range from 0.65 to 0.75 times the tire section height h1. Such insulation rubber layer 15 can surely prevent the separation of the bead reinforcing rubber layer 12.

From the same point of view, it is preferable that the radial dimension L5 of a portion where the bead reinforcing rubber layer 12 contacts with the insulation rubber layer 15 is set to be not less than 0.40 times the radial dimension L4 of the bead reinforcing rubber layer 12. Specifically, the radial dimension L5 is preferably in a range from about 0.50 to 0.70 times the radial dimension L4.

In the present embodiment, a part of the insulation rubber layer 15 is sandwiched between the main portion 6a and the turnup portion 6b of the carcass ply 6A. Such insulation rubber layer 15 can prevent separation of the radially outer end of the carcass ply turnup portions 6b, and serves to further improve the durability of the bead portion 4.

Preferably, the insulation rubber layer 15 includes a portion contacting with the rubber bead apex 11.
In the present embodiment, the insulation rubber layer 15 includes a portion sandwiched between the rubber bead apex 11 and the carcass ply main portion 6a.
This improves the adhesion between the carcass ply main portion 6a and the rubber bead apex 11.
From the same point of view, the thickness of the portion sandwiched between the rubber bead apex 11 and the carcass ply main portion 6a is gradually decreased toward the radially inner end of the insulation rubber layer 15 in this example.

Preferably, the insulation rubber layer 15 includes a portion contacting with the bead core 5.
The portion contacting with the bead core 5 can be rolled up around the bead core 5. Such arrangement of the insulation rubber layer 15 helps to suppress separation of a rubber member starting from the inner end of the insulation rubber layer 15. In order to effectively suppress such separation, the rolled up portion preferably extends radially outwardly beyond the radially outermost end of the bead core, more preferably beyond the radially outer end of the rubber bead apex 11 so that the rolled up portion contacts with the main portion of the insulation rubber layer 15.

While detailed description has been made of a preferable embodiment of the present invention, the present invention can be embodied in various forms without being limited to the illustrated embodiment.

Comparison Test

Figure 4:
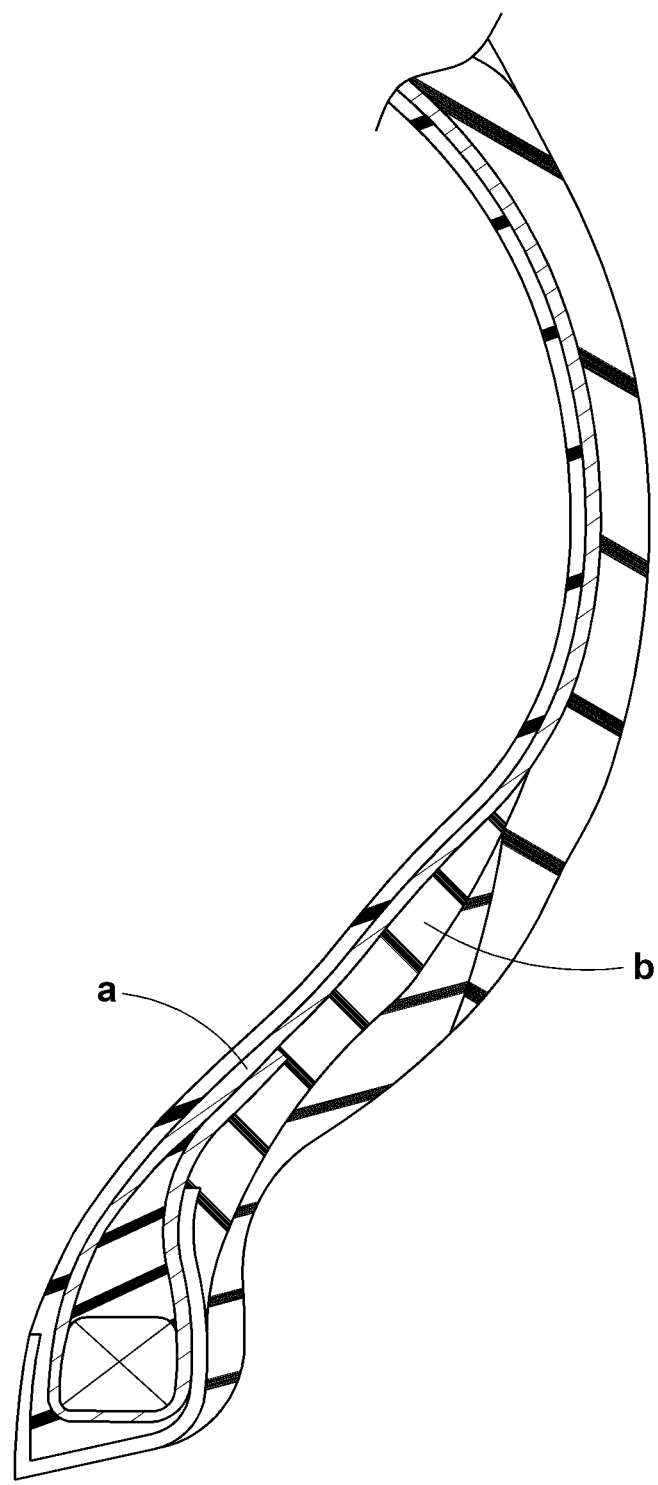
FIG. 4 is a cross-sectional view of a bead portion of a comparative example tire.

Pneumatic tires of size 205/55R16 (rim size 16×6.5J) for passenger cars having specifications shown in Table 1 were experimentally manufactured as test tires Ex1-Ex7 and Ref, and tested for the durability of the bead portions.
The test tires Ex1-Ex7 had structures based on the structure shown in FIGS. 1 and 2. The test tire Ref had a structure based on that shown in FIG. 4 and the structure shown in FIG. 1 from which the insulation rubber layer was omitted.

<Durability Test>
Using a tire test drum, each test tire was continuously run at a speed of 80 km/h under a tire load of 4.2 kN and a tire pressure of 230 kPa until any damage was occurred in the bead portions, and the total running distance was measured. The results are shown in Table 1 by an index based on the comparative test tire Ref being 100, wherein the larger the index number, the better the durability.

TABLE 1

| Tire | Ref | Ex 1 | Ex 2 | Ex 3 | Ex 4 | Ex 5 | Ex 6 | Ex 7 |
|---|---|---|---|---|---|---|---|---|
| structure (FIG. No.) | 4 | 2 | 2 | 2 | 2 | 2 | 2 | 2 |
| L5/L4 | — | 0.55 | 0.40 | 0.50 | 0.60 | 0.70 | 0.55 | 0.55 |
| thickness t1 (mm) | — | 1.5 | 1.5 | 1.5 | 1.5 | 1.5 | 0.8 | 2.3 |
| durability | 100 | 112 | 108 | 112 | 111 | 110 | 109 | 111 |

From the test results, it was confirmed that, according to the present invention, the durability of the bead portions can be improved.

DESCRIPTION OF THE REFERENCE SIGNS 2 tread part
3 side wall part
4 bead part
5 bead core
6 carcass
6A carcass ply
6a main portion
6b turnup portion
11 rubber bead apex
12 bead reinforcing rubber layer
15 insulation rubber layer

The invention claimed is:
1. A tire comprising:
a tread portion whose outer surface defines the tread,
a pair of axially spaced bead portions each provided with a bead core therein, a pair of sidewall portions extending between tread edges of the tread portion and the bead portions, and
a carcass ply extending between the bead portions through the tread portion and the sidewall portions and turned up around the bead core in each of the bead portions from the inside to the outside in the tire axial direction so as to form a pair of turnup portions and a main portion therebetween,
wherein
each of the bead portions is provided with
a rubber bead apex disposed between the turnup portion and the main portion of the carcass ply and extending radially outwardly from the bead core in a tapered manner;
a bead reinforcing rubber layer disposed axially outside the main portion of the carcass ply; and
an insulation rubber layer disposed between the bead reinforcing rubber layer and the main portion of the carcass ply and having a hardness smaller than a hardness of the bead reinforcing rubber layer,
wherein
a hardness of the rubber bead apex is 70 to 90 degrees,
the hardness of the insulation rubber layer is 55 to 70 degrees,
the hardness of the bead reinforcing rubber layer is 70 to 90 degrees,
the thickness of the insulation rubber layer is in a range from 0.8 to 2.3 mm, and
the insulation rubber layer extends
along the main portion of the carcass ply, passing between an axially outer surface of the main portion of the carcass ply and an axially inner surface of the rubber bead apex,
between the axially outer surface of the main portion of the carcass ply and an axially inner surface of a radially outer part of the turnup portion of the carcass ply which part extends radially outwardly beyond a radially outer end of the rubber bead apex, and further
between the axially outer surface of the main portion of the carcass ply and an axially inner surface of a radially outer part of the bead reinforcing rubber layer which part extends radially outwardly beyond a radially outer end of the turnup portion of the carcass ply, wherein
the radially outer end of the rubber bead apex is located at a radial distance L1 from a bead base line which is in a range from 0.10 to 0.20 times a tire section height from the bead base line to a radially outermost end of the tread portion,
wherein
the bead reinforcing rubber layer extends radially outwardly, abutting on an axially outer surface of the turnup portion of the carcass ply, beyond the radially outer end of the turnup portion of the carcass ply, and then extends radially outwardly, abutting on an axially outer surface of the insulation rubber layer,
a radially outer end of the bead reinforcing rubber layer is positioned at a radial distance from the bead base line which is in a range from 0.35 to 0.45 times a tire section height,
a radially inner end of the bead reinforcing rubber layer is positioned at a radial distance from the bead base line which is in a range from 0.05 to 0.15 times the tire section height,
a radially outer end of the insulation rubber layer is positioned radially outside the radially outer end of the bead reinforcing rubber layer, and radially outside a radial position at which a cross sectional width of the tire is maximum,
a dimension in the tire radial direction of a portion of the insulation rubber layer abutting on the bead reinforcing rubber layer is not less than 0.40 times a dimension in the tire radial direction of the bead reinforcing rubber layer,
a clinch rubber is disposed on the axially outside of the bead reinforcing rubber layer so as to form an axially outer surface of the bead portion, and
the clinch rubber has a radially inner end positioned radially inside the radially inner end of the bead reinforcing rubber layer, and a radially outer end positioned radially inside the radially outer end of the bead reinforcing rubber layer.

2. The tire according to claim 1, wherein the insulation rubber layer has a portion contacting with the bead core.

3. The tire according to claim 2, wherein the portion of the insulation rubber layer contacting with the bead core is rolled up around the bead core.

4. The tire according to claim 1, wherein the carcass ply is made of carcass cords coated with a topping rubber whose hardness is equal to the hardness of the insulation rubber layer.

5. The tire according to claim 1, wherein
the hardness of the bead reinforcing rubber layer is equal to the hardness of the rubber bead apex, and
a hardness of a topping rubber of the carcass ply is not smaller than the hardness of the insulation rubber layer.

6. The tire according to claim 1, wherein
the bead reinforcing rubber layer has a radially inner end positioned on the axially outside of the turnup portion of the carcass ply.

7. The tire according to claim 1, wherein the carcass ply is made of carcass cords coated with a topping rubber whose hardness is lower than the hardness of the insulation rubber layer.

8. The tire according to claim 7, wherein the thickness of rubber measured from the carcass cords to the bead reinforcing rubber layer is 1.3 to 2.8 mm.

* * * * *